(12) United States Patent
Kimbara (10) Patent No.: US 11,938,845 B2
(45) Date of Patent: Mar. 26, 2024

(54) SEAT CUSHION (71) Applicant: TOYOTA BOSHOKU KABUSHIKI KAISHA, Aichi-ken (JP)

(72) Inventor: Daigo Kimbara, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/948,584

(22) Filed: Sep. 20, 2022

(65) Prior Publication Data
US 2023/0129527 A1 Apr. 27, 2023

(30) Foreign Application Priority Data
Oct. 27, 2021 (JP) .................. 2021-175383

(51) Int. Cl.
*B60N 2/60* (2006.01)
*B60N 2/02* (2006.01)
*B60N 2/58* (2006.01)
*A47C 1/023* (2006.01)
*B60N 2/62* (2006.01)

(52) U.S. Cl.
CPC .............. *B60N 2/0284* (2013.01); *B60N 2/58* (2013.01); *A47C 1/023* (2013.01); *B60N 2/62* (2013.01)

(58) Field of Classification Search
CPC .......... B60N 2/62; B60N 2/58; B60N 2/0284; A47C 1/023
See application file for complete search history.

(56) References Cited

U.S. PATENT DOCUMENTS

| | | | | |
|---|---|---|---|---|
| 4,773,703 A * | 9/1988 | Krugener | ................. | B60N 2/62 297/284.3 |
| 5,370,444 A * | 12/1994 | Stulik | ...................... | A47C 7/18 5/655.9 |
| 9,039,085 B2 * | 5/2015 | Aselage | ............... | B60N 2/0284 297/284.3 |
| 9,315,132 B2 * | 4/2016 | Mabashi | ............... | B60N 2/5685 |
| 9,421,885 B2 * | 8/2016 | Wiegelmann | ......... | B60N 2/0284 |
| 2021/0114496 A1 * | 4/2021 | Tait | ........................ | B60N 2/62 |
| 2022/0072981 A1 * | 3/2022 | Panchani | ............ | B60N 2/5642 |
| 2023/0129527 A1 * | 4/2023 | Kimbara | ............. | B60N 2/0284 297/284.1 |

FOREIGN PATENT DOCUMENTS

| | | | | |
|---|---|---|---|---|
| EP | 3763560 A1 * | 1/2021 | .......... | B60N 2/0284 |
| JP | 2016-013803 A | 1/2016 | | |

* cited by examiner

*Primary Examiner* — Syed A Islam (74) *Attorney, Agent, or Firm* — Greenblum & Bernstein, P.L.C.

(57) ABSTRACT

A seat cushion includes a cushion rear portion forming a rear portion of the seating surface, a cushion front portion forming a front portion of the seating surface and being configured to approach and separate from the cushion rear portion in a front-rear direction by a cushion length variable mechanism, a cushion cover covering the cushion front portion and the cushion rear portion, a retraction member disposed over a cover back surface of the cushion cover to a first member, and a push-in member provided on a second member, and configured to push the retraction member by the cushion front portion approaching the cushion rear portion, thereby retracting the cushion cover into a gap between the cushion front portion and the cushion rear portion with the retraction member.

7 Claims, 7 Drawing Sheets

SEAT CUSHION

CROSS REFERENCE TO RELATED APPLICATIONS

This application is based on Japanese Patent Applications No. 2021-175383 filed on Oct. 27, 2021, the entire contents of which are incorporated herein by reference.

TECHNICAL FIELD

The present invention relates to a seat cushion. Specifically, the present invention relates to a seat cushion including a cushion length variable mechanism capable of adjusting a length of a seating surface in a front-rear direction.

BACKGROUND ART

JP2016-13803A discloses a seat cushion including a cushion length variable mechanism capable of adjusting a length of a seating surface in a front-rear direction. The cushion length variable mechanism is configured to connect a front portion to a rear portion of the seat cushion in a manner slidable in the front-rear direction, and to adjust an overall length between the front portion and the rear portion by sliding of the front portion.

SUMMARY OF INVENTION

When a cushion cover is placed over the front portion and the rear portion of the seat cushion, it takes effort to appropriately stretch or fold the cushion cover in accordance with a change in the cushion length. Incidentally, the present invention provides a seat cushion capable of causing a cushion cover to follow a change in a cushion length.

According to an aspect of the invention, a seat cushion having a cushion length variable mechanism configured to adjust a length of a seating surface in a front-rear direction includes a cushion rear portion forming a rear portion of the seating surface, a cushion front portion forming a front portion of the seating surface and being configured to approach and separate from the cushion rear portion in a front-rear direction by the cushion length variable mechanism, and a cushion cover covering the cushion front portion and the cushion rear portion.

The seat cushion also includes a retraction member disposed over a cover back surface of the cushion cover to a first member among the cushion front portion and the cushion rear portion, and a push-in member provided on a second member among the cushion front portion and the cushion rear portion, and configured to push the retraction member by the cushion front portion approaching the cushion rear portion, thereby retracting the cushion cover into a gap between the cushion front portion and the cushion rear portion with the retraction member.

According to the above configuration, due to the cushion front portion approaching the cushion rear portion, the push-in member is pressed against the retraction member, and thus the cushion cover is retracted into the gap. As a result, a bridging portion of the cushion cover that is loosened in the gap due to the approaching operation is bent downward without being bent upward, and thus is appropriately folded into the gap. In addition, by the cushion front portion separating forward from the cushion rear portion, the pressing of the push-in member with respect to the retraction member is loosened or released. As a result, the bridging portion of the cushion cover is appropriately stretched while fitting the size of the gap in accordance with the separating operation, without being grasped by the push-in member. In this way, the cushion cover can appropriately follow the change in the cushion length.

The retraction member may be attached to the first member by being attached to a first frame forming a frame of the first member.

According to the above configuration, compared to a case where the retraction member is attached to a member that is likely to be bent such as a pad member, the retraction member can be attached to the first member while being fixed firmly. Therefore, it is possible to control a retraction amount of the retraction member more appropriately when the push-in member is pushed in, and to retract the cushion cover more appropriately.

The push-in member may include a frame member fixed to a second frame forming a frame of the second member.

According to the above configuration, compared to a case where the push-in member is provided to a member that is likely to be bent such as a pad member, the push-in member can be attached to the second member while being fixed firmly. Therefore, it is possible to control a push-in amount of the retraction member by the push-in member more appropriately, and to retract the cushion cover more appropriately.

The retraction member may be configured to apply tension to retract the cushion cover into the gap even at a maximum separation position at which the cushion front portion is separated most from the cushion rear portion.

According to the above configuration, the bridging portion of the cushion cover can be constantly in a stretched state. Examples of the state in which the retraction member applies tension to the cushion cover at the maximum separation position of the cushion front portion include: a state in which the retraction member is pushed in by the push-in member; and a state in which tension is applied to the cushion cover even in a state in which the retraction member is not pushed in by the push-in member.

The retraction member may include a flexible portion configured to be bent by being pressed by the push-in member.

According to the above configuration, since the retraction member is bent by being pressed by the push-in member, the cushion cover can be constantly retracted downward in the vicinity of the push-in member as compared with a configuration in which the retraction member does not bend. Therefore, the cushion cover can be retracted into the gap more appropriately in accordance with whether the position of the cushion front portion is approached or separated.

The retraction member may include a first retraction portion sewn in a shape continuously extending in the seat width direction along the cover back surface, a wire passed through a tubular portion extending in a tubular shape in the seat width direction formed in the first retraction portion, and a second retraction portion bridged between a part of the wire in the seat width direction and the first member, and the push-in member is configured to be pressed against the second retraction portion.

According to the above configuration, since the push-in member is pressed against the second retraction portion provided in a part of the retraction member in the seat width direction, a retraction force is applied via the wire across a wide range in the seat width direction of the first retraction portion. Therefore, it is possible to rationalize the retraction structure of the retraction member using the push-in member.

DESCRIPTION OF EMBODIMENTS

Hereinafter, embodiments of the present invention will be described with reference to the drawings.

First Embodiment

Schematic Configuration of Seat Cushion 1

First, a configuration of a seat cushion 1 according to a first embodiment of the present invention will be described with reference to FIGS. 1 to 7. In the following description, directions such as front, rear, upper, lower, left, and right directions indicate directions shown in the drawings. In addition, in the following description, when a specific reference diagram is not shown, or when there is no reference numeral corresponding to the reference diagram, any one of FIGS. 1 to 7 is referred to as appropriate.

Figure 1:
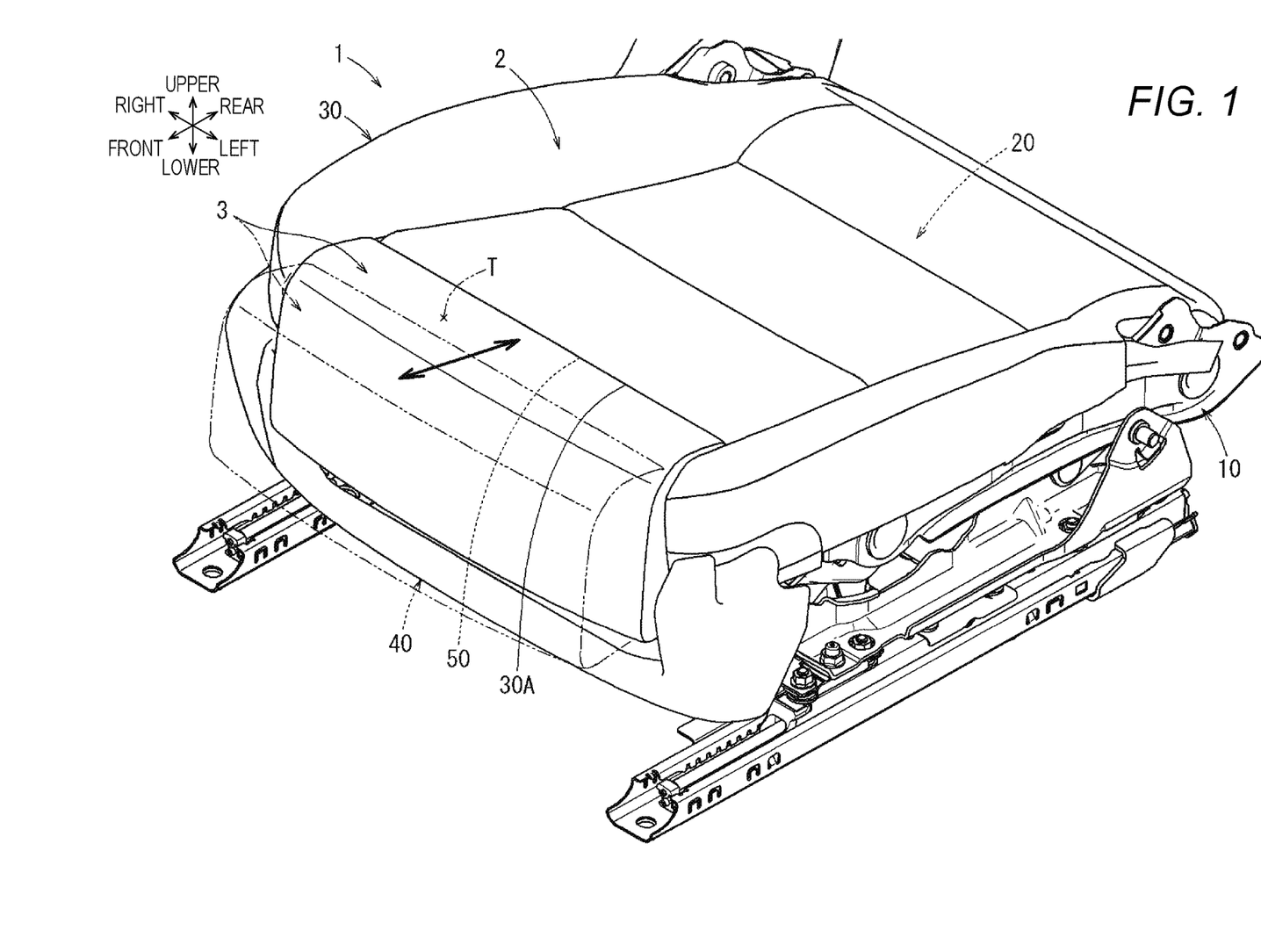
FIG. 1 is a perspective view illustrating a configuration of a seat cushion according to a first embodiment.
Figure 2:
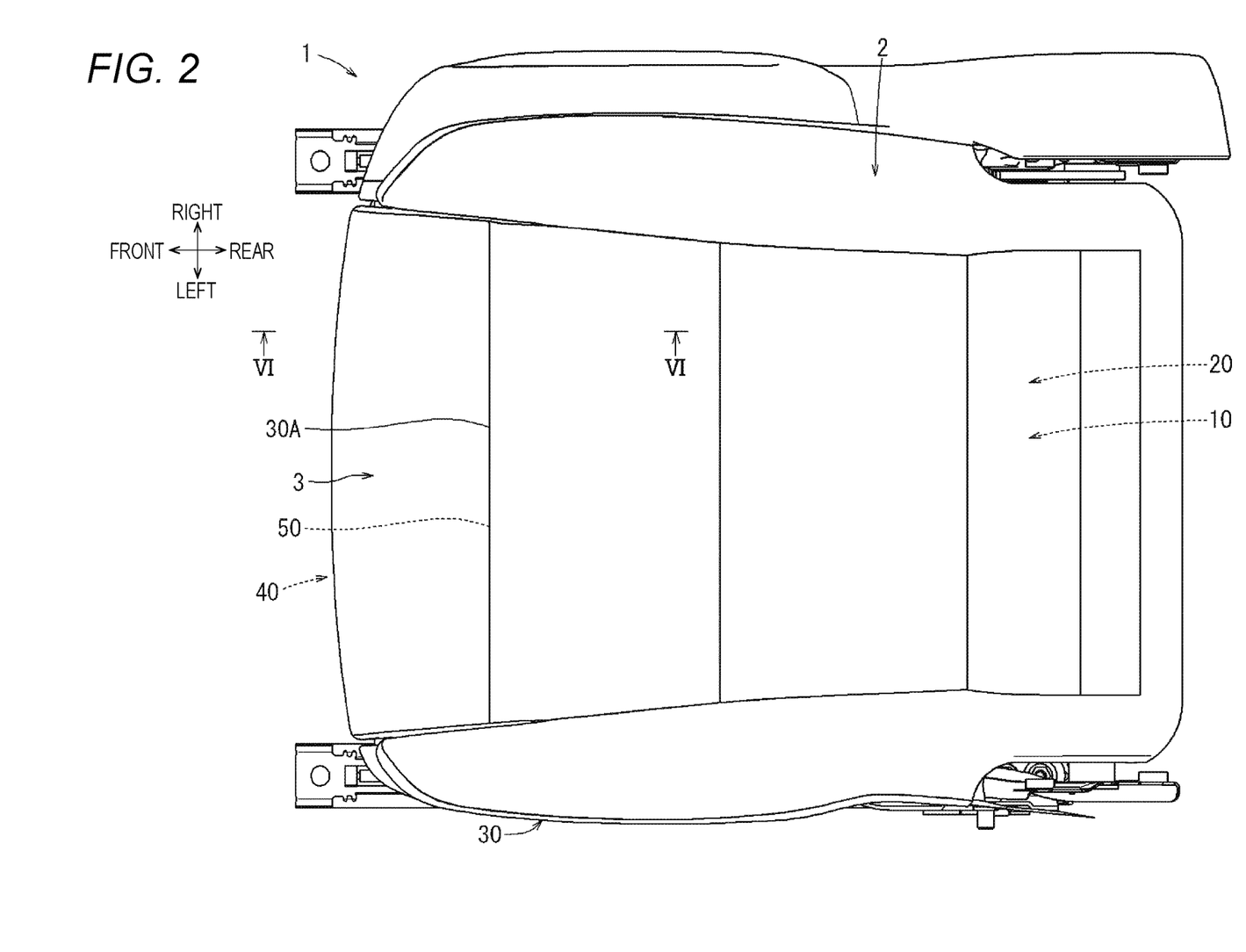
FIG. 2 is a plan view of a seat cushion.
Figure 3:
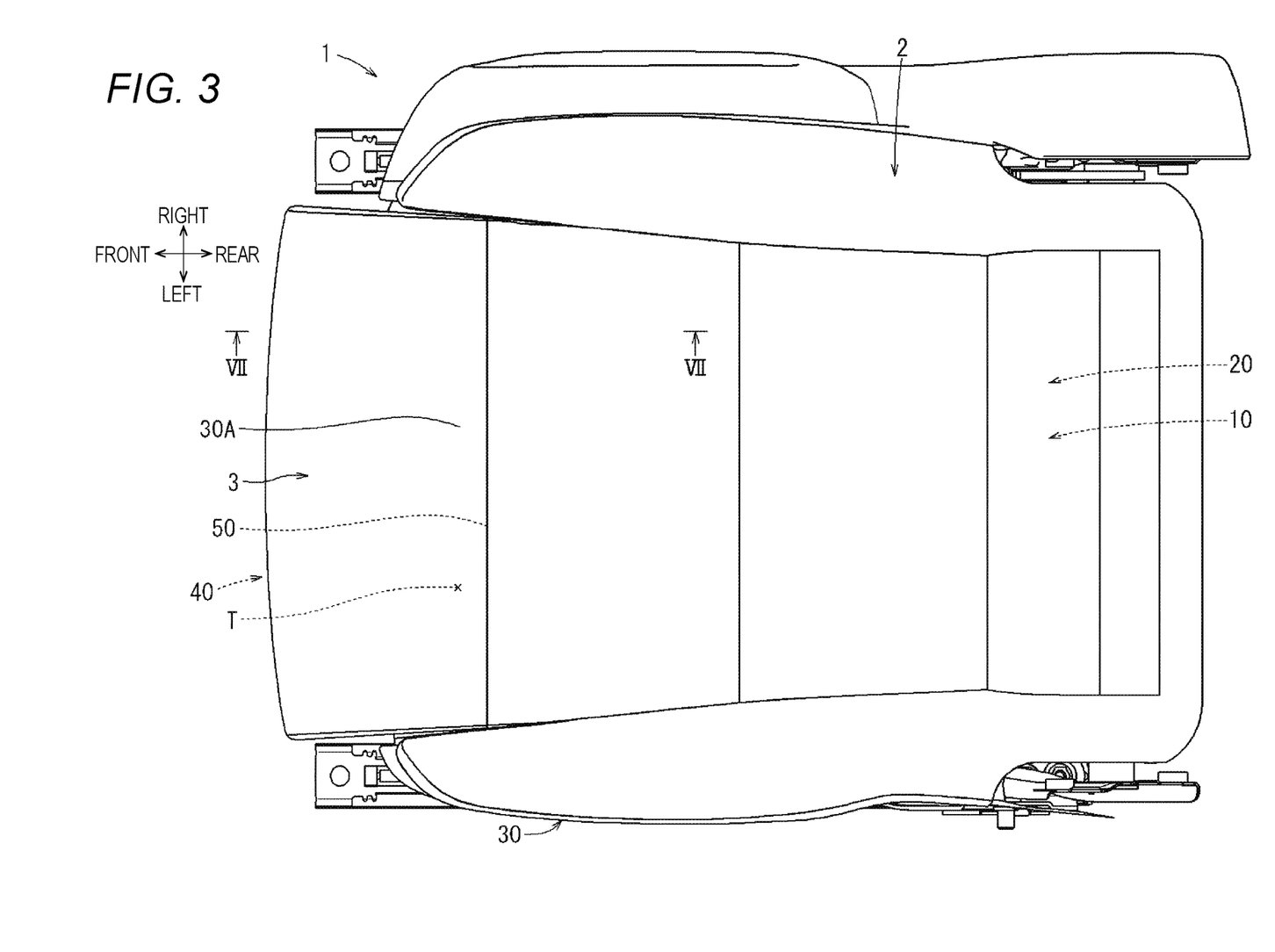
FIG. 3 is an expanded plan view of the seat cushion after deployment.
Figure 4:
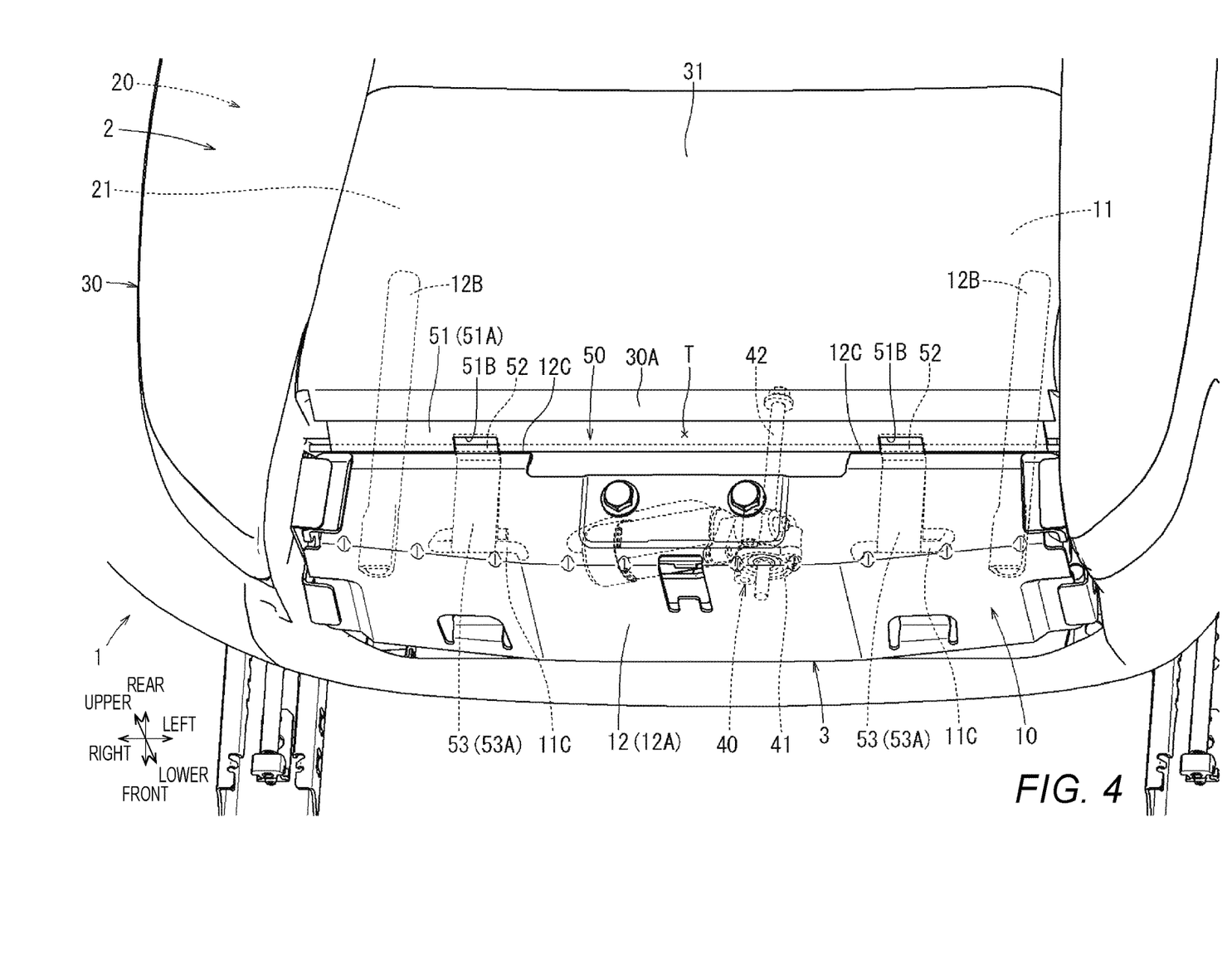
FIG. 4 is a partially visible perspective view of the internal structure of the seat cushion.

As shown in FIG. 1, a seat cushion 1 according to the present embodiment is configured as a seating portion of a seat of an automobile. The seat includes a seat back (not shown) serving as a backrest portion for a seated person, and the seat cushion 1.

The seat cushion 1 includes a metal cushion frame 10 that forms an internal framework thereof, and a cushion pad 20 made of urethane foam that is assembled to the upper portion of the cushion frame 10 and elastically supports the buttocks and thighs of the seated person from below. Further, the seat cushion 1 includes a cushion cover 30 made of synthetic leather that covers the cushion pad 20 above the cushion frame 10 from above, thereby covering the entire surface of the seat cushion 1.

The seat cushion 1 includes an electric cushion length variable mechanism 40 capable of adjusting a cushion length which is a length of the seating surface in the front-rear direction. The cushion length variable mechanism 40 is configured to change the cushion length by causing a cushion front portion 3 forming the front portion of the seating surface to approach and separate from a cushion rear portion 2 forming the rear portion of the seating surface of the seat cushion 1 in the front-rear direction.

The seat cushion 1 also includes a retraction member 50 that applies tension to a bridging portion 30A of the cushion cover 30 hanging over the gap between the cushion front portion 3 and the cushion rear portion 2 from above. The retraction member 50 is a member that controls the cushion length variable mechanism 40 to appropriately stretch or fold the bridging portion 30A of the cushion cover 30 extending between the cushion front portion 3 and the cushion rear portion 2 in accordance with the movement of the cushion front portion 3 approaching and separating from the cushion rear portion 2 in the front-rear direction (see FIGS. 2 to 7). Here, the cushion rear portion 2 corresponds to the "first member" of the present invention. The cushion front portion 3 corresponds to the "second member" of the present invention.

Configuration of Parts of Seat Cushion 1

Hereinafter, a specific configuration of parts of the seat cushion 1 will be described. As shown in FIGS. 4 to 7, the cushion frame 10 includes a rear frame 11 that forms a framework of the cushion rear portion 2, and a front frame 12 that forms a framework of the cushion front portion 3. Although not shown in detail, the rear frame 11 is configured to have a frame shape in a plan view extending along the peripheral edge of the cushion rear portion 2.

A frame front portion of the rear frame 11 includes a front panel 11A whose panel surface is oriented in the height direction. The front panel 11A widely supports a rear pad 21 of the cushion pad 20 provided above the front panel 11A in a planar shape from below, and widely supports the thighs of the seated person, which are pressed against the region, in a surface shape from below.

Figure 5:
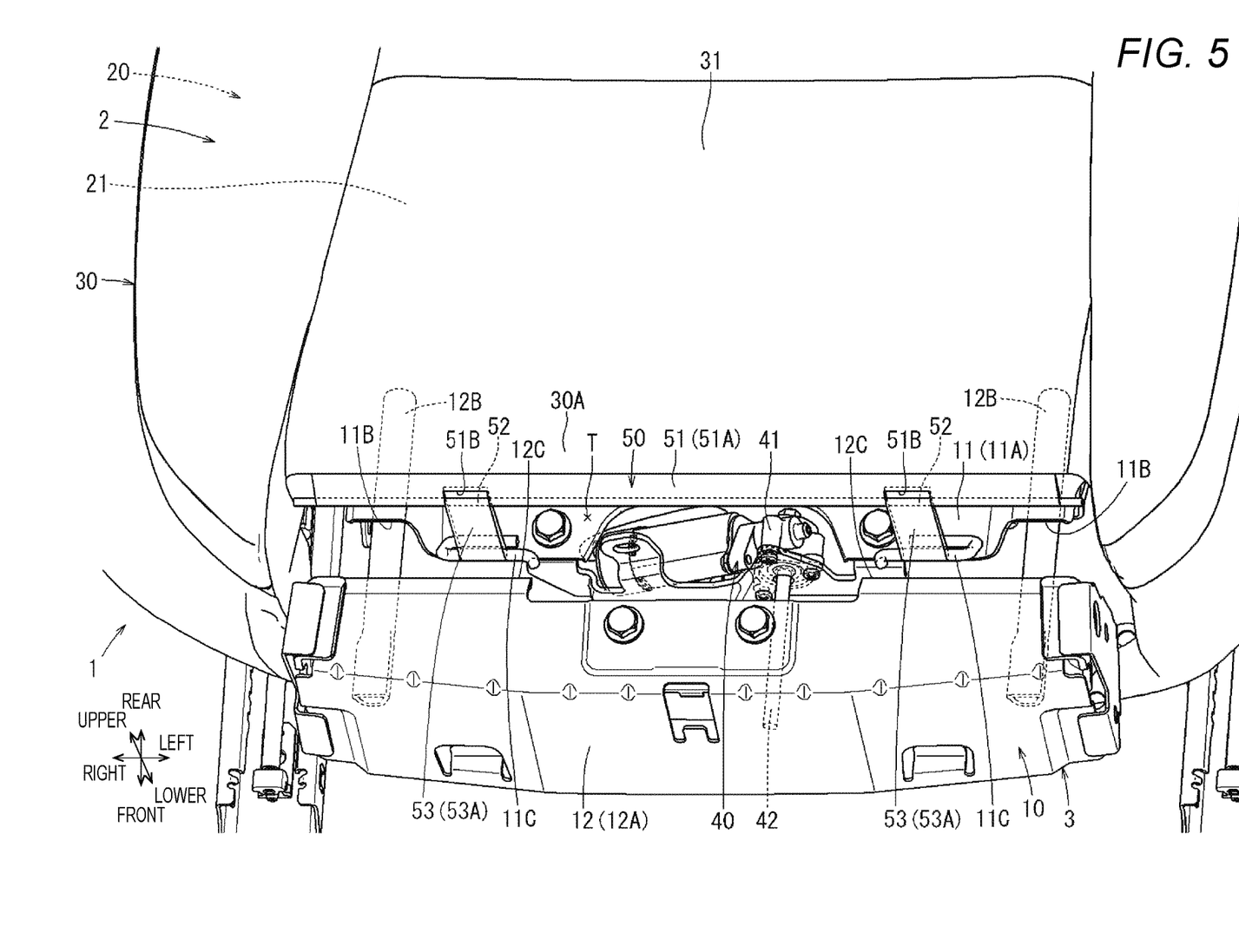
FIG. 5 is a partially visible perspective view of the expanded internal structure of the seat cushion.
Figure 6:
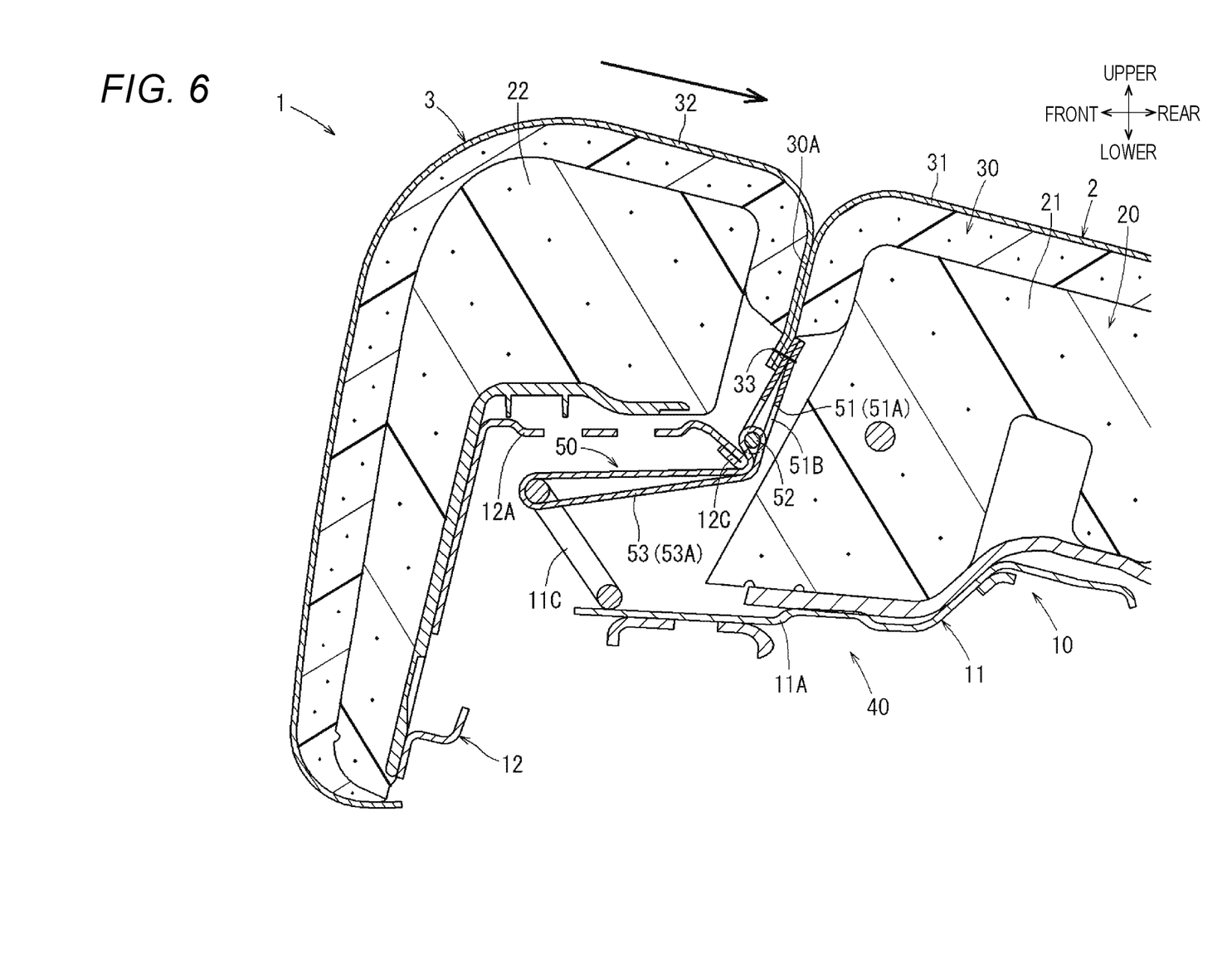
FIG. 6 is a cross-sectional view taken along line VI-VI in FIG. 2.
Figure 7:
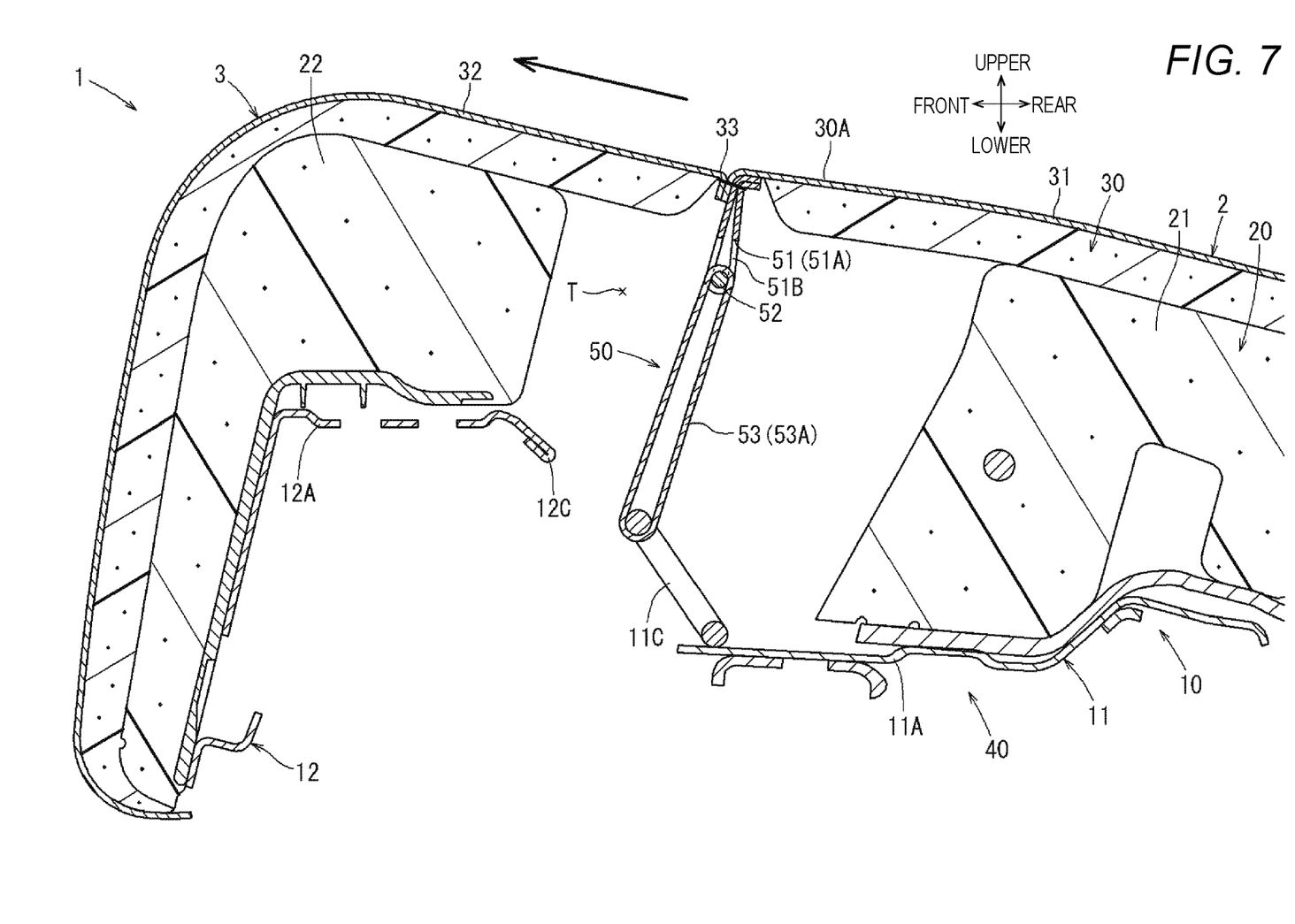
FIG. 7 is a sectional view taken along line VII-VII of FIG. 3.

As shown in FIGS. 5 to 7, hook wires 11C are welded to the upper surface of the front panel 11A at two symmetrical positions on the left and right sides of the front panel 11A. The lower end portion of a tubular portion 53A of a second retraction portion 53 constituting the retraction member 50, which will be described later, is passed through and hooked to each corresponding hook wire 11C. Each of the hook wires 11C has a configuration bent into an open frame shape whose lower corner is open. Here, the rear frame 11 corresponds to the "first frame" of the present invention.

Frame lower portions of the hook wires 11C are welded to the upper surface of the front panel 11A in a gesture inclined forward. The lower end portion of the tubular portion 53A of the second retraction portion 53 of the retraction member 50 is set in a state of being passed through the opening of the lower corner of each corresponding hook wire 11C, and being passed through the frame upper portions thereof. As a result, each of the hook wires 11C supports the tubular portion 53A of the corresponding second retraction portion 53, which is passed through the hook wire 11C, in a manner swingable in the front-rear direction about the frame upper portion thereof.

As shown in FIG. 5, the front frame 12 is formed in a U shape in a plan view extending along the peripheral edge of the cushion front portion 3. The front side of the U shape of the front frame 12 is constituted by a movable panel 12A made from a panel member bent in an inverted L-shape in a side view.

The movable panel 12A supports a front pad 22 (see FIG. 6) of the cushion pad 20 provided above the movable panel 12A in a planar shape from below by a top plate thereof whose panel surface is oriented in the height direction. As a result, the thighs of the seated person, which are pressed against the region, are widely supported in a surface shape from below.

As shown in FIG. 5, guide pipes 12B extending straight rearward are welded to two symmetrical positions on the left and right sides of the movable panel 12A. The guide pipes 12B are each made of a round pipe member, and form left and right sides of the U shape of the front frame 12.

The guide pipes 12B are each set in a state of being inserted from the front into a corresponding rectangular tubular guide rail 11B formed at the left and right edges of the front panel 11A. As a result, the guide pipes 12B are each supported in a manner slidable only in the front-rear direction along the corresponding guide rail 11B. Due to the above assembly, the front frame 12 is assembled to the rear frame 11 in a state slidable only in the front-rear direction.

The front frame 12 has a sliding movable range in the front-rear direction with respect to the rear frame 11 that is regulated, by a contact structure in a slide direction (not shown) provided therebetween, to a range between a maximum approach position shown in FIG. 6 and a maximum separation position shown in FIG. 7. The front frame 12 is driven by the cushion length variable mechanism 40, which will be described later, thereby approaching and separating from the rear frame 11 in the front-rear direction, or stopping at any position with a braking force applied thereto.

As shown in FIG. 5, two symmetrical positions on the left and right sides of the top plate of the movable panel 12A are each formed with a push-in portion 12C extending in a bent shape obliquely rearward and downward from the rear edge of the top plate. The push-in portions 12C are respectively formed at the front positions of the second retraction portions 53 of the retraction member 50 described above.

As shown in FIG. 6, each push-in portion 12C is pressed against the corresponding second retraction portion 53 of the retraction member 50 from the front as the front frame 12 approaches the rear frame 11 rearward. As a result, each push-in portion 12C retracts the pressed portion of the corresponding second retraction portion 53 of the retraction member 50 downward while bending the pressed portion rearward in a bent shape.

Due to such retraction, the bridging portion 30A of the cushion cover 30 is retracted into a narrow gap T between the front pad 22 and the rear pad 21 and is folded in a V shape in a side view. Here, each second retraction portion 53 corresponds to the "flexible portion" of the present invention. The movable panel 12A including the push-in portions 12C corresponds to the "push-in member" of the present invention.

As shown in FIG. 6, in a state in which the front frame 12 is moved to the maximum approach position at which the front frame 12 approaches most to the rear frame 11, each push-in portion 12C is moved to a position beyond the corresponding hook wires 11C rearward.

Each push-in portion 12C gradually changes the pressing position with respect to the corresponding second retraction portion 53 of the retraction member 50 in accordance with the movement to the position described above. However, since each push-in portion 12C is formed in a shape extending obliquely rearward and downward from the top plate of the movable panel 12A, the push-in portion 12C is not in contact with a wire 52 or a first retraction portion 51 of the retraction member 50, which will be described later, but is in contact with only the corresponding second retraction portion 53, even in a state in which the front frame 12 is moved to the maximum approach position shown in FIG. 6.

As shown in FIG. 7, each push-in portion 12C is separated forward from the corresponding second retraction portion 53 of the retraction member 50 as the front frame 12 separates from the rear frame 11 forward. As a result, each second retraction portion 53 of the retraction member 50 is released from the state of being pushed in by the corresponding push-in portions 12C, thereby reducing the retraction force applied to the bridging portion 30A of the cushion cover 30. As a result, the bridging portion 30A of the cushion cover 30 is stretched over a wide gap T between the front pad 22 and the rear pad 21 in a flush manner.

The cushion pad 20 has a configuration divided into halves including the rear pad 21 assembled to the rear frame 11 and the front pad 22 assembled to the front frame 12 of the cushion frame 10. The rear pad 21 and the front pad 22 are assembled to the rear frame 11 and the front frame 12, respectively, and then cover the cushion cover 30 over the frames from above. The rear pad 21 and the front pad 22 are held in a state where the rear pad 21 and the front pad 22 are individually held by the rear frame 11 and the front frame 12 at fixed positions by the front, rear, left and right peripheral edges of the cushion cover 30 covered as described above being fixed to the frames.

The cushion cover 30 has an integral cover structure including a rear cover 31 covering the rear pad 21 and a front cover 32 covering the front pad 22. The rear cover 31 and the front cover 32 are joined together by sewing edges thereof to each other. A seam 33, where the edges of the rear cover 31 and the front cover 32 are sewn together, is sewn in a manner protruding toward the back side of these covers (lower side in the drawing).

As shown in FIG. 7, the seam 33 is formed to be positioned on the gap T between the cushion front portion 3 and the cushion rear portion 2 in a state where the cushion front portion 3 is moved to the maximum separation position where the cushion front portion 3 is most separated forward from the cushion rear portion 2. That is, the rear cover 31 of the cushion cover 30 is configured to have an extension portion (bridging portion 30A) extending forward from the rear pad 21 in a state where the cushion front portion 3 is moved to the maximum separation position.

The front cover 32 of the cushion cover 30 is configured to have an extension portion (bridging portion 30A) extending rearward from the front pad 22 in a state where the cushion front portion 3 is moved to the maximum separation position. As the cushion front portion 3 approaches the cushion rear portion 2 rearward, the cushion cover 30 is retracted into the gap T into a V shape by the retraction member 50 sewn to the seam 33. Here, the seam 33 corresponds to the "cover back surface" of the present invention.

As shown in FIG. 5, the cushion length variable mechanism 40 includes a motor 41 fixed to the lower portion of the front panel 11A, and a feed screw 42 extending forward from the motor 41 and connected to the rotation output portion of the motor 41 to be capable of transmitting power. The front end of the feed screw 42 is connected to the movable panel 12A.

The cushion length variable mechanism 40 is rotationally driven in a corresponding operation direction by the motor 41 by operating an electric switch (not shown) provided at the outer side of the seat cushion 1 in the vehicle width direction. As a result, the feed screw 42 is rotationally driven in the corresponding operation direction and is moved in the front-rear direction with respect to the motor 41. As a result, the movable panel 12A connected to the front end of the feed screw 42 is moved to approach and separate from the front panel 11A in the front-rear direction.

Retraction Member 50

As shown in FIG. 5, the retraction member 50 includes a first retraction portion 51 formed of cotton cloth in a band shape extending in the seat width direction, and a metal wire 52 passed through in a shape extending in the seat width direction along the lower end portion of the retraction portion. In addition, the retraction member 50 has a pair of left and right second retraction portions 53 formed of cotton cloth in a vertically long belt shape bridged between two symmetrical positions on the left and right sides of the wire 52 and the corresponding hook wires 11C provided on the front panel 11A, respectively. The first retraction portion 51 and the second retraction portions 53 are each formed of a cotton cloth having a lower elongation property than that of the cushion cover 30.

The first retraction portion 51 is sewn in a manner extending continuously in the seat width direction along the seam 33 between the rear cover 31 and the front cover 32. Specifically, the first retraction portion 51 is folded back into a U-shape in a side view, and both ends thereof are sewn to the seam 33. Thus, the first retraction portion 51 is each formed in a shape having a tubular portion 51A extending in a tubular shape in the seat width direction.

The wire 52 is provided in a state of being passed through the tubular portion 51A of the first retraction portion 51 in the seat width direction. Specifically, the wire 52 is provided in a state of being passed over the entire region of the tubular portion 51A in the seat width direction. Due to the above assembly, the wire 52 is provided in a state of being exposed from openings 51B formed at two symmetrical positions on the left and right sides of the lower portion of the first retraction portion 51.

Each of the second retraction portions 53 is formed in a shape having a tubular portion 53A that is sewn in a shape entirely extending in a tubular shape in the seat width direction. The upper end portions of the tubular portions 53A of the second retraction portions 53 are passed into the respective openings 51B of the first retraction portion 51, and are passed through by the wire 52 inserted into the tubular portion 51A of the first retraction portion 51, whereby the second retraction portions 53 are assembled to the first retraction portion 51 via the wire 52. Further, the lower end portions of the tubular portions 53A of the second retraction portions 53 are passed through the respective hook wires 11C provided on the front panel 11A described above, whereby the second retraction portions 53 are assembled to the front panel 11A via the respective hook wires 11C.

Due to the above assembly, the retraction member 50 is provided in a state of being bridged between the seam 33 on the back side of the bridging portion 30A of the cushion cover 30 and the front panel 11A. As shown in FIG. 7, in a state where the cushion front portion 3 is most separated forward, the retraction member 50 is not pushed in by the push-in portions 12C described above, and is in a posture stretched straight between the seam 33 of the cushion cover 30 and the hook wires 11C of the front panel 11A.

That is, in a state where the cushion front portion 3 is most separated forward, the retraction member 50 is not in a loosened state, but is set to a length so as to apply tension for retracting the seam 33 of the cushion cover 30 downward. Therefore, in a state in which the cushion front portion 3 is most separated forward, the bridging portion 30A of the cushion cover 30 is stretched in a state where tension is applied in different directions at three contacting points thereof, including the upper corner of the front edge of the rear pad 21, the upper corner of the rear edge of the front pad 22, and the seam 33 connected to the retraction member 50.

As a result, the bridging portion 30A of the cushion cover 30 is stretched in a state where the surface rigidity is increased by the support at the three points. Therefore, even when the thigh of the seated person is applied to the bridging portion 30A, the thigh can be appropriately supported in the bridging portion 30A with enhanced surface rigidity, and absence of cushion feeling is less likely to be felt.

Specifically, when the cushion front portion 3 is moved to the maximum separation position, the retraction member 50 applies tension that retracts the bridging portion 30A of the cushion cover 30, stretched on the gap T in a flush manner, downward to such an extent that the shape of the bridging portion 30A is not distorted. Therefore, it is possible to appropriately increase the surface rigidity of the bridging portion 30A without impairing the appearance and cushioning feeling of the bridging portion 30A of the cushion cover 30. Further, a folding movement of the bridging portion 30A toward the lower side can be smoothly performed by the retraction member 50.

In the retraction member 50, as shown in FIG. 6, when the cushion front portion 3 is moved to the maximum approach position at which the cushion front portion 3 approaches most to the cushion rear portion 2, each of the above-described push-in portions 12C is pushed into the corresponding second retraction portion 53 from the front. As a result, in the retraction member 50, each of the pushed-in portions of the second retraction portions 53 is pressed to be bent rearward with the corresponding hook wire 11C on the lower end side serving as a fulcrum.

As a result, in the retraction member 50, each pressed and bent second retraction portion 53 retracts the wire 52 downward, and retracts the first retraction portion 51 downward via the wire 52. At this time, the retraction member 50 applies a force to retract the first retraction portion 51 downward over a wide range in the seat width direction via the wire 52, even in a configuration in which each second retraction portion 53 is provided only in a part in the seat width direction and is pushed in by the corresponding push-in portion 12C.

Therefore, the retraction member 50 can uniformly apply a force to retract the seam 33 of the cushion cover 30 downward over a wide range in the seat width direction. In addition, since the retraction member 50 is configured to be pressed and bent by the push-in portions 12C, the seam 33 of the cushion cover 30 can be constantly retracted downward in the vicinity of each push-in portion 12C as compared with a configuration in which the retraction member 50 does not bend. Therefore, the cushion cover 30 can be retracted into the gap T more appropriately in accordance with whether the position of the cushion front portion 3 is approached or separated.

In summary, the seat cushion 1 according to the present embodiment has the following configuration. In the following description, reference signs in parentheses correspond to respective configurations shown in the above embodiment.

That is, the seat cushion (1) includes the cushion length variable mechanism (40) capable of adjusting the length of the seating surface in the front-rear direction. The seat cushion (1) includes the cushion rear portion (2) forming the rear portion of the seating surface. The seat cushion (1) includes the cushion front portion (3) forming the front portion of the seating surface and being configured to approach and separate from the cushion rear portion (2) in the front-rear direction by the cushion length variable mechanism (40). The seat cushion (1) includes the cushion cover (30) as a cover member covering the cushion front portion (3) and the cushion rear portion (2).

The seat cushion (1) includes the retraction member (50) bridged between the cover back surface (33) of the cushion cover (30) and the first member (2) among the cushion front portion (3) and the cushion rear portion (2). The seat cushion (1) includes the push-in member (12A) provided on the second member (3) among the cushion front portion (3) and the cushion rear portion (2). The push-in member (12A) is configured to apply a pressing force to the retraction member (50) by the cushion front portion (3) approaching the cushion rear portion (2), thereby retracting the cushion cover (30) into the gap between the cushion front portion (3) and the cushion rear portion (2) via the retraction member (50).

According to the above configuration, due to the cushion front portion (3) approaching the cushion rear portion (2), the push-in member (12A) is pressed against the retraction member (50), and thus the cushion cover (30) is retracted into the gap (T). As a result, the bridging portion (30A) of the cushion cover (30) that is loosened in the gap (T) due to the approaching operation is bent downward without being bent upward, and thus is appropriately folded into the gap (T).

By the cushion front portion (3) separating forward from the cushion rear portion (2), the pressing of the push-in member (12A) with respect to the retraction member (50) is loosened or released. As a result, the bridging portion (30A) of the cushion cover (30) is appropriately stretched while fitting the size of the gap (T) in accordance with the separating operation, without being grasped by the push-in member (12A). In this way, the cushion cover (30) can appropriately follow the change in the cushion length.

The retraction member (50) is attached to the first member (2) by being attached to the first frame (11) forming the frame of the first member (2). According to the above configuration, compared to a case where the retraction member (50) is attached to a member that is likely to be bent such as a pad member, the retraction member (50) can be attached to the first member (2) while being fixed firmly. Therefore, it is possible to control the retraction amount of the retraction member (50) more appropriately when the push-in member (12A) is pushed in, and to retract the cushion cover (30) more appropriately.

The push-in member (12A) includes the frame member fixed to the second frame (12) forming the frame of the second member (3). According to the above configuration, compared to a case where the push-in member (12A) is provided to a member that is likely to be bent such as a pad member, the push-in member (12A) can be attached to the second member (3) while being fixed firmly. Therefore, it is possible to control the push-in amount of the retraction member (50) by the push-in member (12A) more appropriately, and to retract the cushion cover (30) more appropriately.

The retraction member (50) is configured to apply tension to retract the cushion cover (30) into the gap (T) even at the maximum separation position at which the cushion front portion (3) is separated most from the cushion rear portion (2). According to the above configuration, the bridging portion (30A) of the cushion cover (30) can be constantly in a stretched state.

The retraction member (50) includes the flexible portion (53) configured to be bent by being pressed by the push-in member (12A). According to the above configuration, since the retraction member (50) is bent by being pressed by the push-in member (12A), the cushion cover (30) can be constantly retracted downward in the vicinity of the push-in member (12A) as compared with a configuration in which the retraction member (50) does not bend. Therefore, the cushion cover (30) can be retracted into the gap (T) more appropriately in accordance with whether the position of the cushion front portion (3) is approached or separated.

The retraction member (50) includes the first retraction portion (51) sewn in a shape continuously extending in the seat width direction along the cover back surface (33), the wire (52) passed through the tubular portion (51A) extending in a tubular shape in the seat width direction formed in the first retraction portion (51), and the second retraction portion (53) extending between a part of the wire (52) in the seat width direction and the first member (2). The push-in member (12A) is configured to be pressed against the second retraction portion (53).

According to the above configuration, since the push-in member (12A) is pressed against the second retraction portion (53) provided in a part of the retraction member (50) in the seat width direction, a retraction force is applied via the wire (52) across a wide range in the seat width direction of the first retraction portion (51). Therefore, it is possible to rationalize the retraction structure of the retraction member (50) using the push-in member (12A).

Other Embodiments

Although embodiments of the present disclosure have been described above using one embodiment, the present disclosure can be implemented in various forms described below in addition to the above-described embodiment.

1. The seat cushion of the present invention is applied to a seat mounted on a vehicle such as an automobile, but may also be applied to a seat amounted on a vehicle other than wheeled vehicles such as an aircraft or a ship, in addition to wheeled vehicles such as an automobile or a train. The seat cushion may be applied to a non-vehicle seat such as a viewing seat installed in various facilities such as a sport facility, a theater, a concert venue, and an event venue, or a massage seat.

2. In addition to synthetic leather, the cushion cover may be made of natural leather. The cushion cover may be formed of a fabric. Further, in addition to the seam where the cover pieces are sewn together, the cover back surface connected to the retraction member of the cushion cover may be a general surface at an intermediate portion of the cover piece.

3. The retraction member may be bridged between the cover back surface of the cushion cover and the cushion front portion, and the push-in member may be provided on the cushion rear portion. In such a configuration, it is also possible to adopt a configuration in which the push-in member is pushed into the retraction member by the rearward movement of the cushion front portion and the cushion cover is retracted via the retraction member.

The attachment to the first member among the cushion front portion and the cushion rear portion of the retraction member may be performed at a place other than the frames, such as a pad. Further, the push-in member may be provided not on the frame of the second member among the cushion front portion and the cushion rear portion, but on a member other than the frames, such as a pad.

The retraction member may be formed of a rigid body that does not bend even when pressed by the push-in member. The retraction member may be in a loosed state without applying tension to the cushion cover at the maximum separation position at which the cushion front portion is separated most from the cushion rear portion. In addition, the retraction member may be in a state of being pressed by the push-in member even at the maximum separation position.

In addition to the configuration as described in the above embodiment in which two portions separated from each other in the seat width direction are pushed in by the push-in members, the retraction member may have a configuration in which one portion in the seat width direction or three or more portions separated in the seat width direction are pushed in by the push-in member. Further, the retraction member may be pushed in by the push-in member over the entire region in the seat width direction. In addition to the retraction structure including the first retraction portion, the wire, and the second retraction portions as described in the above embodiment, the retraction member may be formed by only a single piece of cotton cloth.

4. In addition to an electric one, the cushion length variable mechanism may have a manual configuration that can switch between lock and unlock via a manual operation on a lever by the user and move the cushion front portion with respect to the cushion rear portion in the front-rear direction.

What is claimed is:

1. A seat cushion having a cushion length variable mechanism configured to adjust a length of a seating surface in a front-rear direction, the seat cushion comprising:
   a cushion rear portion forming a rear portion of the seating surface;
   a cushion front portion forming a front portion of the seating surface and being configured to approach and separate from the cushion rear portion in a front-rear direction by the cushion length variable mechanism;
   a cushion cover covering the cushion front portion and the cushion rear portion;
   a retraction member disposed over a cover back surface of the cushion cover to a first member among the cushion front portion and the cushion rear portion; and
   a push-in member provided on a second member among the cushion front portion and the cushion rear portion, and configured to push the retraction member by the cushion front portion approaching the cushion rear portion, thereby retracting the cushion cover into a gap between the cushion front portion and the cushion rear portion with the retraction member.

2. The seat cushion according to claim 1, wherein the retraction member is attached to the first member by being attached to a first frame forming a frame of the first member.

3. The seat cushion according to claim 1, wherein the push-in member includes a frame member fixed to a second frame forming a frame of the second member.

4. The seat cushion according to claim 1, wherein the retraction member is configured to apply tension to retract the cushion cover into the gap even at a maximum separation position at which the cushion front portion is separated most from the cushion rear portion.

5. The seat cushion according to claim 4, wherein the cushion cover includes a rear cover, a front cover, and a seam allowance portion for sewing the rear cover and the front cover together, the rear cover is configured to apply a first tension for pulling the seam allowance portion in a first direction,
the front cover is configured to apply a second tension for pulling the seam allowance portion in a second direction different from the first direction, and
the retraction member is configured to apply a third tension for polling the seam allowance portion in a third direction different from the first direction and the second direction.

6. The seat cushion according to claim 1, wherein the retraction member includes a flexible portion configured to be bent by being pressed by the push-in member.

7. A seat cushion having a cushion length variable mechanism configured to adjust a length of a seating surface in a front-rear direction, the seat cushion comprising:
   a cushion rear portion forming a rear portion of the seating surface;
   a cushion front portion forming a front portion of the seating surface and being configured to approach and separate from the cushion rear portion in a front-rear direction by the cushion length variable mechanism;
   a cushion cover covering the cushion front portion and the cushion rear portion;
   a retraction member disposed over a cover back surface of the cushion cover to a first member among the cushion front portion and the cushion rear portion; and
   a push-in member provided on a second member among the cushion front portion and the cushion rear portion, and configured to push the retraction member by the cushion front portion approaching the cushion rear portion, thereby retracting the cushion cover into a gap between the cushion front portion and the cushion rear portion with the retraction member, wherein
   the retraction member includes a first retraction portion sewn in a shape continuously extending in the seat width direction along the cover back surface, a wire passed through a tubular portion extending in a tubular shape in the seat width direction formed in the first retraction portion, and a second retraction portion bridged between a part of the wire in the seat width direction and the first member, and the push-in member is configured to be pressed against the second retraction portion.

* * * * *